United States Patent [19]
Moraru et al.

[11] Patent Number: 5,333,140
[45] Date of Patent: Jul. 26, 1994

[54] SERVOWRITER/CERTIFIER

[75] Inventors: Alex Moraru, Fremont; Bill R. Baker, Redwood City; Yechel A. Yassif, Santa Clara, all of Calif.

[73] Assignee: Helios Incorporated, Sunnyvale, Calif.

[21] Appl. No.: 770,642

[22] Filed: Oct. 3, 1991

[51] Int. Cl.$^5$ .................... G11C 29/00; G06F 7/02
[52] U.S. Cl. ................................. 371/21.2; 371/67.1
[58] Field of Search ............... 371/21.2, 21.3, 24, 371/67.1; 360/78.05

[56] References Cited

U.S. PATENT DOCUMENTS

| | | | |
|---|---|---|---|
| 4,268,905 | 5/1981 | Johann et al. | 364/200 |
| 4,630,269 | 12/1986 | Gershenson et al. | 371/24 |
| 4,754,222 | 6/1988 | Felleisen et al. | 324/212 |
| 4,996,608 | 2/1991 | Widney | 360/51 |
| 5,050,169 | 9/1991 | Monett | 371/21.2 |
| 5,091,808 | 2/1992 | Nigam | 360/78.05 |
| 5,115,358 | 5/1992 | Widney | 360/75 |
| 5,153,788 | 10/1992 | Nishikawa et al. | 360/77.08 |
| 5,166,936 | 11/1992 | Ewert et al. | 371/21.6 |
| 5,227,930 | 7/1993 | Thanos et al. | 360/78.04 |

Primary Examiner—Robert W. Beausoliel, Jr.
Assistant Examiner—Joseph E. Palys
Attorney, Agent, or Firm—Thomas E. Schatzel

[57] ABSTRACT

A microcomputer controlled media and disk testing system having a media servowriting subsystem and a certification subsystem. The servowriting subsystem comprises a precision magnetic read/write (R/W) head positioning device based on a laser positioning device and pattern generating and writing circuitry. The certification subsystem comprises of an apparatus to open bit windows and adjust thresholds and to assess the quality and nature of defects from the positions of bits and their analog characteristics when read back relative to such windows.

11 Claims, 4 Drawing Sheets

Fig. _1

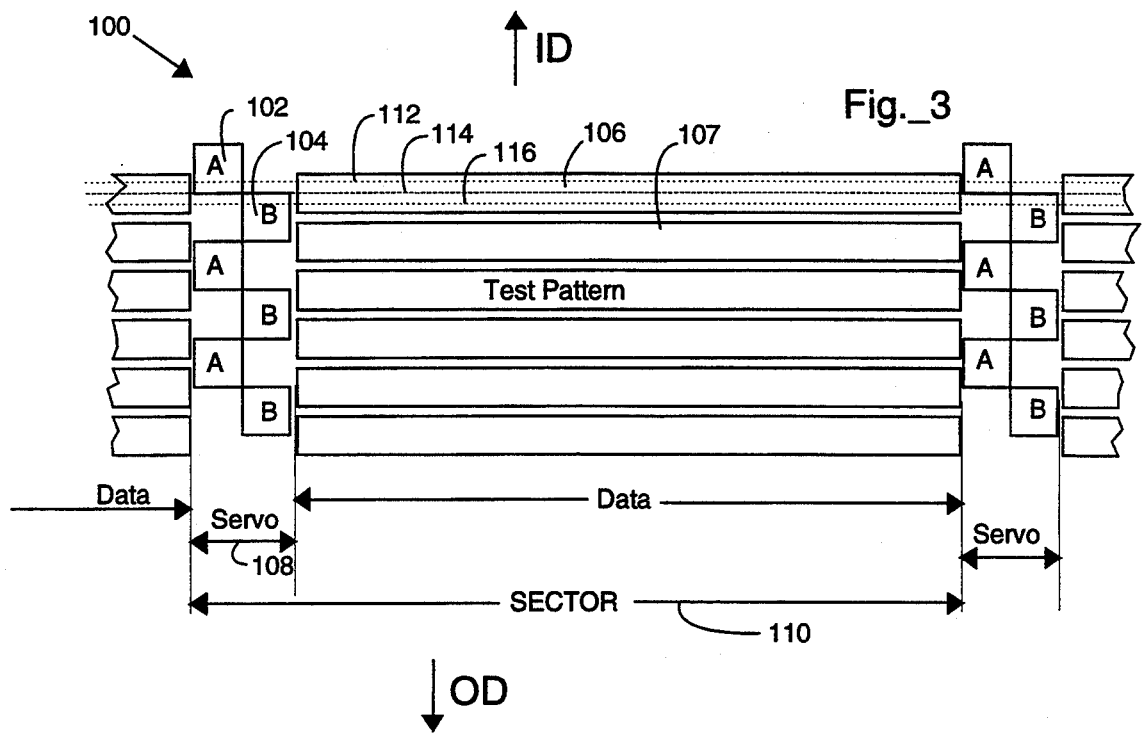
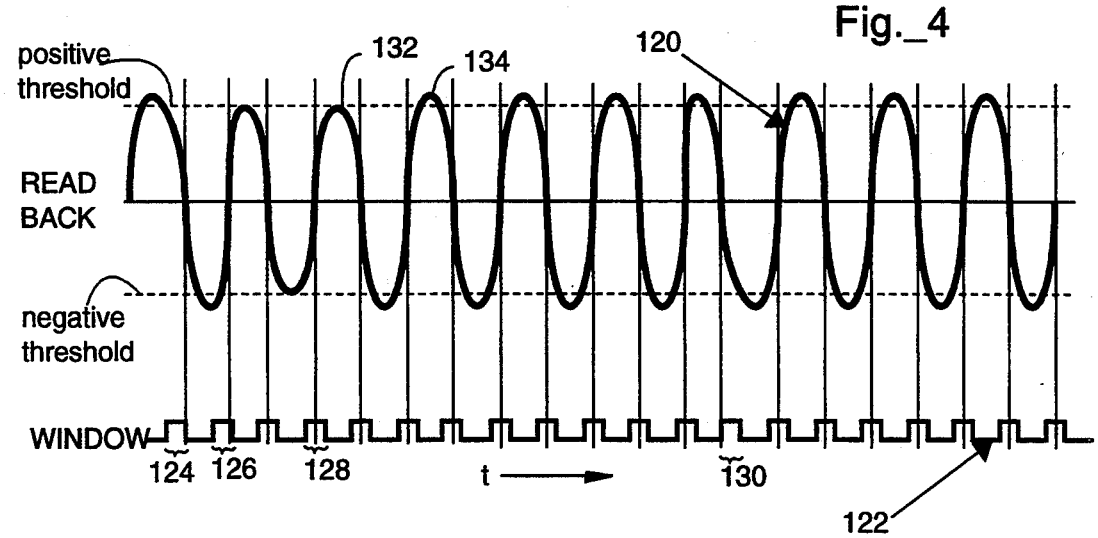

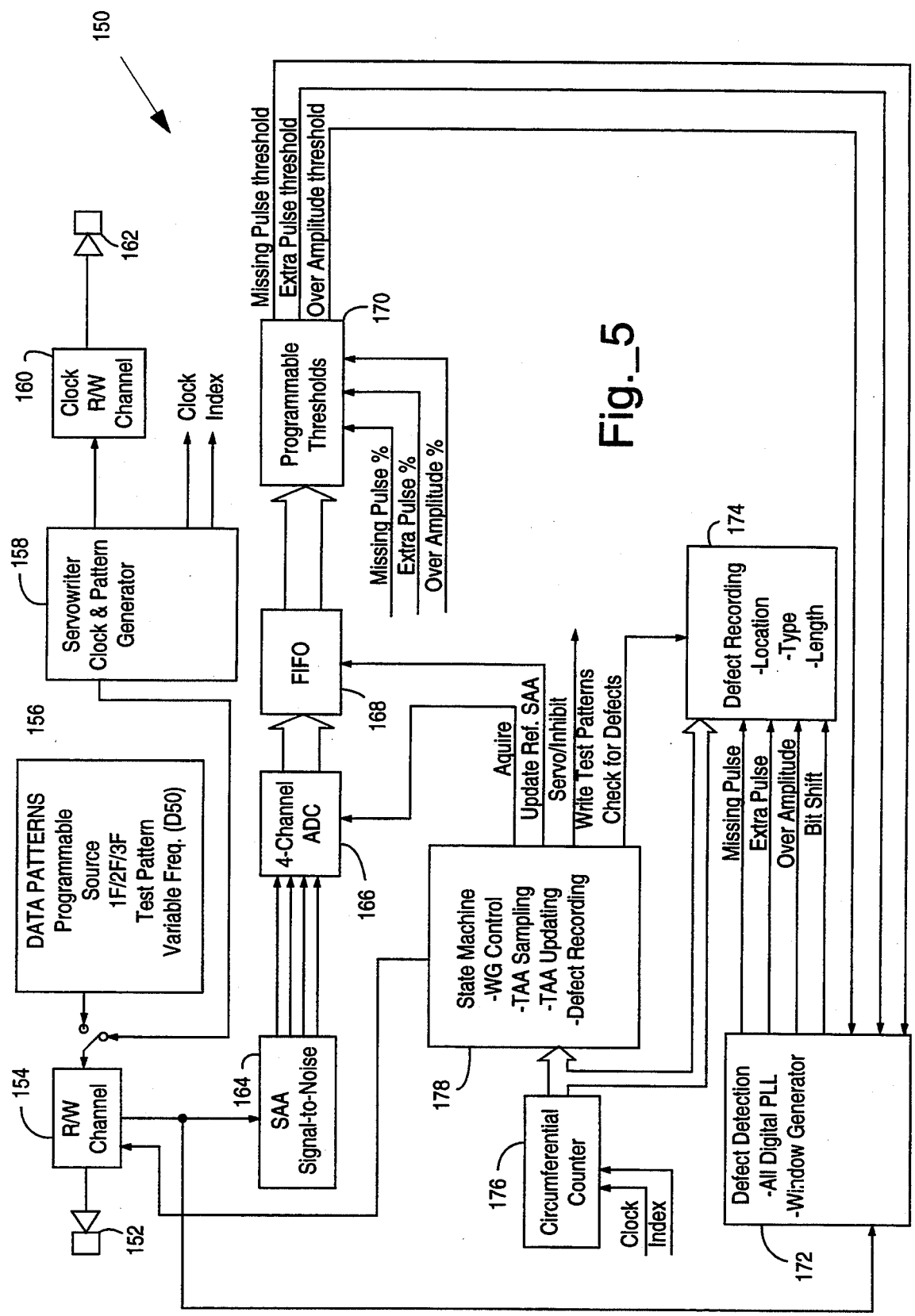
Fig._5

SERVOWRITER/CERTIFIER

BACKGROUND OF THE INVENTION

1. Field of the Invention

The invention relates generally to the testing of magnetic media and drives, and specifically to servowriting a previously untested floppy disk first, then certifying the disk such that the locations of any and all media defects can be identified and logged.

2. Description of the Prior Art

There are two principal operations involved in the prior art manufacture of magnetic media and disk drives. First, a certification of the quality of the media is done with specialized equipment. Second, a servowriting operation is done that places reference information on the surface of the media. ("Servowriting" places data on a disk that is used to for precise positioning of the heads on the media.) Certification usually means that 100% of the surface of the media is tested. In servowriting, the reference information is placed in very specific locations. The prior art practice has been to test and certify the media first and then write the servo information. Some prior art systems put down a magnetic index mark and record displacement angles of media defects with respect to the magnetic index mark. Then a physical index, typically a small punched hole, is placed such that identified media defects will not coincide with the physical index mark. The present invention puts the reference information down first, and then does the certification step. To do this means that there must be much more intricate control of the test process than had previously existed to avoid overwriting the reference information. But the advantage is media defects are very rapidly and precisely located.

As the capacity and performance of hard disks continue to advance, the number of tracks per inch (TPI) grows higher and higher. Higher density requires the use of servo positioning systems to accurately position the heads. Servowriters are required to properly write the servo position information on the disk.

Servowriting is a critical production step for a number of reasons. Since the drive can not be functionally tested until the servo information is in place, many production problems are discovered during servowriting or immediately after. If a problem does arise that prevents proper servowriting, the cause of the problem must be quickly determined. Diagnosis of the problem is often very difficult. Uncertainty about servowriter performance or reliability compounds the problem. Problems that affect more than a small percentage of hard disk assemblies (HDAs) may shut down production. Servowriters have a significant impact on development schedules too. The design of the servowriter is usually on the critical path to product introduction. Unless a servowriter is very similar to one that is already developed and successfully in use, the design and development process can be very arduous, delay production of the drive, and even delay the development process of the drive itself.

Magnetic disks and especially floppy disks consist of ferrite compounds on a substrate. Common floppy disks comprise MYLAR coated on both sides with ferric oxide. It is a common practice in the disk media industry to initially manufacture all floppy disks in a single batch, and then grade them into various classifications according to how well they test. The disks that are able to accept error free recordings in the highest density formats are certified for premium use, and carry the highest prices. Some disks will accept less dense formats, and so are certified as a standard, or economy grade. And, of course, those disks that cannot accept even the simplest of formats are discarded as waste.

Magnetic disk drives and their media have advanced to the point that even small media defects can cause serious data errors, or other problems, because the storage densities are so high. Track-to-track densities have now exceeded 2000 tracks-per-inch (TPI). Some media defects can be large enough to prevent using a particular disk in the industry standard high density ("HD") or in very high density ("VHD") format, and yet the same defects can still be minor enough that the same disk can be used in the (older) single density ("SD") or double density ("DD") formats. Very often defects occur only on one side of the media, so such a disk could also be certified and sold as single sided "SS," as opposed to double sided ("DS"). Disk media certifiers have evolved to test and grade floppy disks.

Read/write disk recording heads have been used in the prior art for both servowriting and certification functions. Single gap heads, using five to 60 milliamp currents and a center tap are typical. Floppy disk drives typically employ heads that are meant to contact the media during normal use. Various hard disks, such as Winchesters, literally fly the heads on an air cushion very close to the spinning media. The "flying height" reference (head to disk) varies from one disk type to the next. Pre-recorded servotracks need to have standardized servo track information recorded in them. The bit patterns within such servotracks can be single pulse or dipole. The issues related to servotrack recording include index-to-servo pattern tolerance, track-to-track timing tolerance, absolute track zero tolerance, and the so-called "D50" measurement. "D50" is a measure of high density recording performance. Usually, servo pulses are at lower density, so D50 is not directly related. Test programs should take into account such things as media errors, head checks, calibration checks, etc.

Various methods have developed in the prior art for measuring sector average amplitude (SAA) and the setting of thresholds for missing pulse, over-amplitude pulse, high frequency modulation, and bit shift. A prior art method of charging a capacitor with a given time constant for SAA has not been accurate enough, and some have suggested sampling the envelope to obtain a more accurate average. Methods of using automatic gain control (AGC) have also been used.

A significant problem with prior art disk media certification is that the locations of defects are not known except in the crudest of ways (e.g., the side and distance from an index mark).

SUMMARY OF THE PRESENT INVENTION

It is therefore an object of the present invention to provide a magnetic media servowriter/certifier system and method that is quick, accurate, and economical to use.

Briefly, an embodiment of the present invention is a microcomputer controlled system having a media servowriting subsystem and a certification subsystem. The servowriting subsystem comprises a precision magnetic read/write (R/W) head positioning device based on a laser positioning device and pattern generating and writing circuitry. The certification subsystem comprises means to open bit windows and adjust thresholds and to assess the quality and nature of defects from the positions of bits and their analog characteristics when read back relative to such windows.

An advantage of the present invention is that manufacturing yields of media and drives are improved.

Another advantage of the present invention is that fewer revolutions of the media are needed to servowrite and certify each track. The savings in production time per disk is substantial, given that now hundreds of tracks per disk must be tested.

Another advantage of the present invention is that the locations of defects in the media are quickly identified and can be "worked around."

Another advantage of the present invention is that a bad block map can be written to the media immediately after servowriting/certification to communicate to a user the identity and location of media defects.

Another advantage of the present invention is that defects that are marginal, but acceptable, can be identified and prevented from causing future malfunction of the media.

Another advantage of the present invention is that the complete testing and servowriting of media takes much less time, and higher production volumes can thus be sustained with fewer such systems in use.

Another advantage of the present invention is that the versatile architecture for servowriters reduces the development risks and cuts the development schedules of hard disk design programs.

These and many other objects and advantages of the present invention will no doubt become obvious to those of ordinary skill in the art after having read the following detailed description of the preferred embodiments which are illustrated in the various drawing figures.

IN THE DRAWINGS

FIG. 3 is a representation of a small section of the surface of the disk media showing a few sectors each of three adjacent, concentric circular tracks. Direction ID points to the center of the media while direction OD points to the outside circumference;

FIG. 4 is a graph of the read back waveforms for a typical 3F data pattern and a window signal used to gate read bits; and FIG. 5 is a functional block diagram of a disk servowriting and certification system according to the present invention.

DETAILED DESCRIPTION OF THE PREFERRED EMBODIMENTS

First Embodiment of the Present Invention

Figure 1:
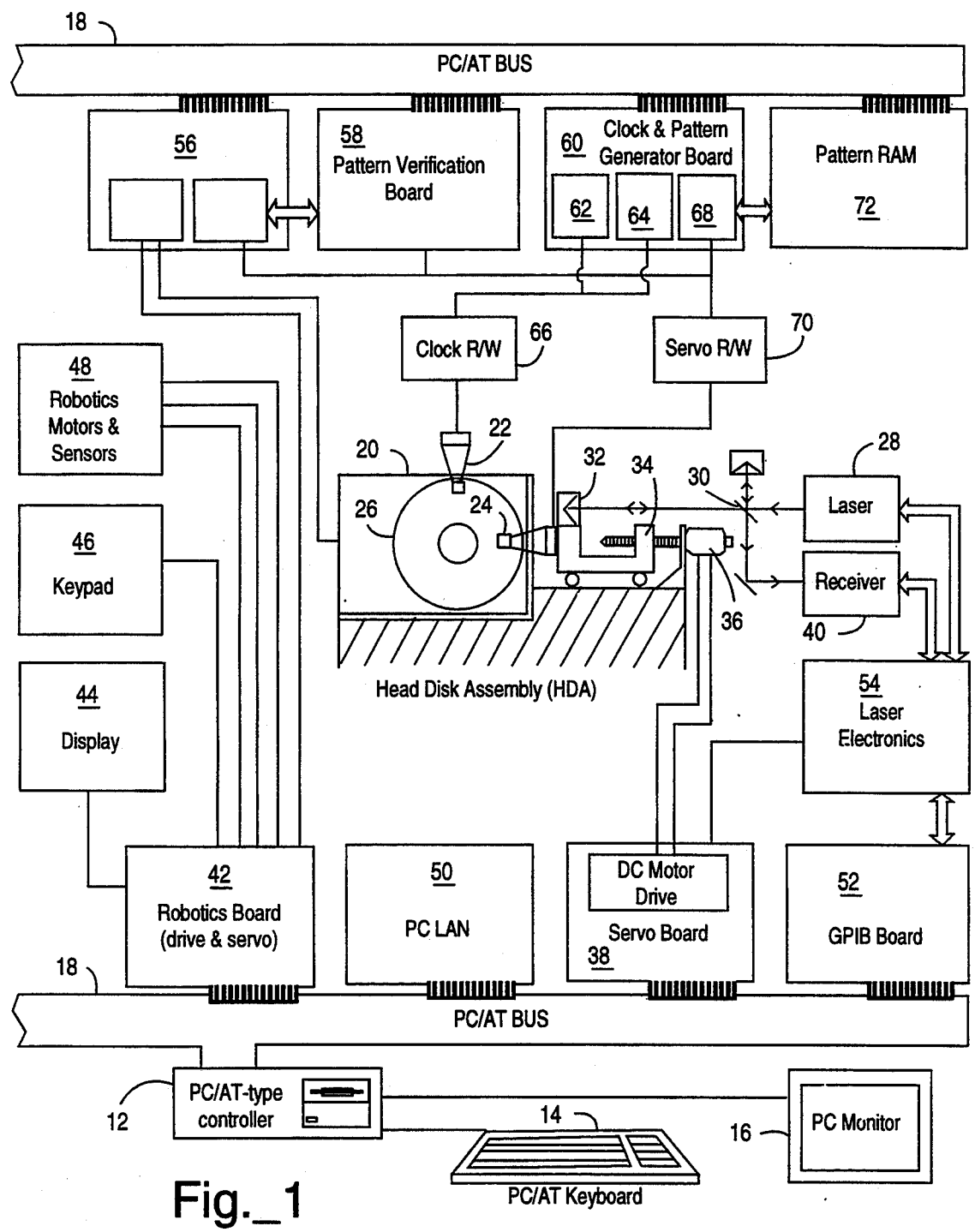
FIG. 1 is system block diagram of a disk servowriter & certifier system according to a first embodiment of the present invention.
Figure 2:
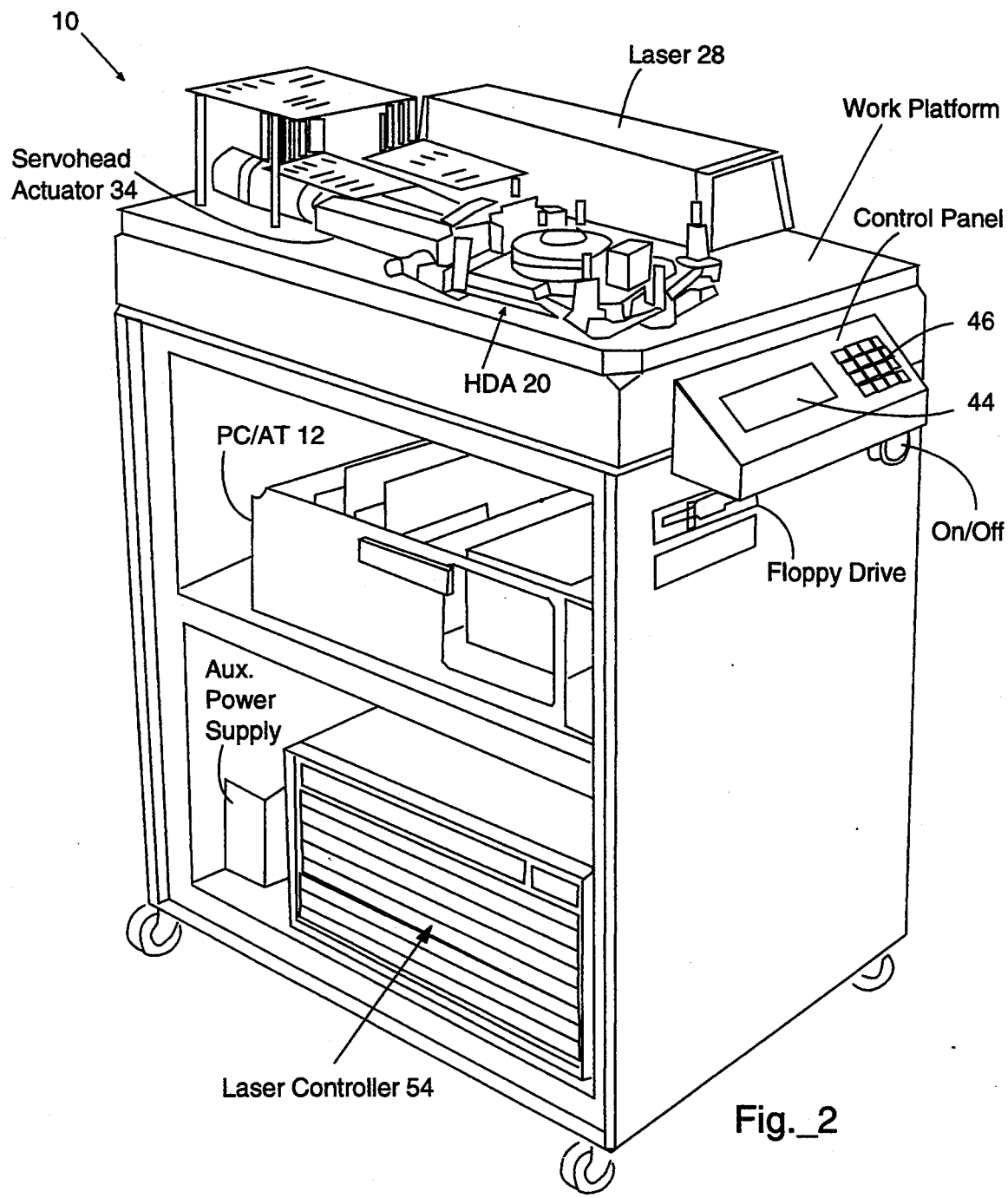
FIG. 2 is a perspective view of an exemplary way to package the system of FIG. 1.

FIGS. 1 and 2 illustrate a system 10 which is comprised of a system controller 12 having a keyboard 14 and a CRT display 16; a bus 18 for expansion boards; a head disk assembly (HDA) 20 associated with a clock head 22, a servo head 24, and a disk media 26; a laser 28 that shines through mirror 30 and reflects off of retroreflector 32 mounted on mechanism 34 driven by motor 36 and servo board 38; a laser light receiver 40; a robotics expansion board 42 connected to a display 44, a 16-button keypad 46, and robotics motors & sensors 48; a personal computer (PC) local area network (LAN) expansion board 50; a general purpose interface bus expansion board 52; a laser electronics controller 54; a user expansion board 56; a pattern verification expansion board 58; a clock & pattern generator expansion board 60 having modules 62 and 64 that drive a clock R/W preamplifier board 66 and a module 68 that drives a servo R/W preamplifier boards 70; and, a servo pattern RAM expansion board 72.

FIG. 2 depicts a exemplary method of packaging system 10 in a convenient roll-around cart. A control panel at one end has the display 44 and keypad 46 above a floppy disk for PC/AT 12.

System Controller

System controller 12 (FIG. 2) is an IBM personal computer model PC/AT, or "IBM PC/AT compatible," (hereinafter referred to simply as "PC/AT 12") which is equipped with a 360 kilobyte (360 KB) floppy disk drive for system software loading. A hard disk can be used as an alternative adjunct to the floppy disk. PC/AT 12 is not modified in any way from the commercially available unit, except that various expansion boards that plug into PC/AT bus 18 are added. Keyboard 14 and CRT display 16 can be omitted to make the roll-around cart (FIG. 2) a bit easier to move about, or they can be included to allow the user access to a full range of controls.

PC/AT 12 is used as the vehicle to initialize each expansion board correctly, to start each basic step, and to sequence through the required operations. A basic operation, such as writing the servo information on a track or verifying the servo information, does not require intervention of PC/AT 12. The clock and pattern generation board, and the pattern verification board are two examples.

Robotic/Control Interface Subsystem

A robotics/control interface subsystem comprises the 16-button keypad 46, the two-line operator display 44, and the robotics motors & sensors 48 for motor & solenoid control, sensor state detection, and interfacing to programmable write current sources. The robotics board 42 provides control logic and driver circuitry, and it draws power for its logic from PC/AT 12 over bus 18 and power for other functions from the auxiliary power supply.

Motor and Solenoid Control

Motors for HDA 20 clamping and the clock head position motor are driven through a (passive) interconnect board by the robotics board 42. Registers loaded by software control motor direction, speed, and force. Motor current is monitored on robotics board 42. Current is applied to clamping motors during clamping, and is proportional to the programmed force to be applied. All clamping motors are connected in series with one another.

The solenoid drive is used when the normal HDA 20 head must be held in a restrained position for some operations.

Sensor State Detection

Sensors detect the positions of the items that move. The sensors are modular infrared light source (LED)/photo transistor assemblies. They output a high logic level when an infrared beam has been blocked by a mechanical interrupter connected to a device whose position is being monitored. The sensor's photo transistor is preferably open collector, with pull-up resistors located on the interconnect board. The output of the sensors is fed through the interconnect board to robotics board 42, where it is loaded into registers read by PC/AT 12.

Front Panel Keypad/Display

Logic for driving the operator display 44 and sensing the 16-button keypad is contained on robotics board 42.

Programmable Write Current Sources

Two programmable current sources are used on robotics board 42 for user applications requiring programmable write currents. Normally, the write current is determined by a socketed resistor on a R/W preamplifier board (e,g., board 66). When a programmable write current is required, these two write current sources are activated and controlled through software commands. Their output is routed to the R/W boards 66 and 70.

Servo Head Positioning Subsystem

A servo head positioning subsystem provides the precise positioning of the servo pattern writing head required for successful servowriting. Position tracking is configured to be a closed-loop system and typically uses the laser position transducer for servo head position feedback shown in FIG. 1. Other tracking methods are acceptable and can produce good results.

In some user applications, system 10 uses a separate servopattern writing head (e.g., head 24). In these instances, the external position actuator 34 (FIG. 1) is used. In other applications, HDA 20's internal servo head is used to write servo patterns. Often an external position actuator will also be used in these applications. When the internal head is used, a laser beam-reflecting mirror (e.g., retroreflector 32 or a cube corner) should be attached to the actuator arm.

The servo head positioning subsystem initially moves servopattern writing head 24 to a known position predefined on HDA 20, such as a "crash stop." This operation will establish a "home" position, and the laser system is then used to track position from the home position by providing an up/down count. The laser controller 54 receives general operation commands via GPIB expansion board 52. The commands include movement direction and destination value. Laser controller 54 has an internal high speed position data bus which connects to its internal position board. The position board calculates the difference between the destination value and the present position, and drives servohead 24 accordingly.

An external power amplifier is used to drive the actuator. The actuator power amplifier (board 38) receives an analog voltage input that can vary ±10 volts, and uses a current to drive the servohead actuator (e.g., motor 36).

Special acceleration/deceleration compensation data is also used in controlling head movement. Laser controller 54 receives such information from PC/AT 12, and it feeds a proportional drive current to the servopattern head actuator (normally the drive's voice coil motor [VCM] or a stepper motor) to position it appropriately, in response to commands from PC/AT 12. When a position equals the destination value (within programmable tolerances), a "done bit" is set that indicates to the servopattern generator 68 that servohead 24 is ready for writing the next servo track.

The program rechecks that the done bit remains true a specified number of times before the servotrack is written, this to avoid settling transients. Some versions of system 10 use a position board located external to laser controller 54.

Laser Position Transducer

A laser position transducer subsystem consists of the laser head 28, optics, interferometer, receiver 40, and a system controller 54 (FIG. 1). The laser head 28 serves as the light beam and reference frequency source. The optics and the receiver 40 use the laser beam to generate a measurement signal. Reference and measurement signals are used to generate positional information. PC/AT 12 sends destination input data to laser controller 54, which then outputs a real time digital error signal representing the position difference between the destination and the actual position.

A low-power laser in laser head 28 emits a light beam composed of two slightly different optical frequencies. Before exiting the laser head assembly, the beam passes through a mirror 30, where a small fraction of the emitted beam is sampled and is used to generate a reference frequency. The mirror 30 is oriented such that a reflected and a transmitted beam are at right angles to each other. The transmitted frequency passes through the interferometer and is reflected back to the interferometer by a movable retroreflector 32 (corner cube) linked to servohead 24 and actuator 34. When retroreflector 32 changes position relative to the fixed interferometer, a Doppler frequency shift occurs that is proportional to the direction and velocity of movement.

The laser beam is directed to receiver 40 where the two frequency components mix. This produces a difference frequency which is found by the receiver's photodetector and converted to an electrical signal. Receiver 40 has circuitry that then amplifies a measurement frequency signal. Displacement information is obtained in laser controller 54 by a comparison of the measurement and reference signals. Laser controller 54 outputs an up/down count representing the actual position compared to the desired destination value.

Head Position Actuator

Preferably, the internal actuator of HDA 20 is used to control servohead 24. Otherwise, external actuator 34 is used and it can be a linear or rotary type.

Actuator 34 is typically driven by a DC motor, as is conventional. The positioning feedback is normally used by the laser system, although alternative configurations can use position feedback from actuator 34 or the drive module itself.

Clock Writing Subsystem

The clock generation circuits are very flexible and can accommodate a wide variation in clock rates. The clock generation circuitry uses closure of less than +1-12.5 nanoseconds. Circuitry is included to write index, verify that the index is correct, check for multiple indexes, and measure clock closure. The pattern generation circuits are very flexible and programmable. The pattern generation is a frame oriented system built up in two levels. (In this terminology, a frame is simply a pre-defined series of bits.) The bit patterns for up to eight thousand different frames are stored in suitable computer memory, e.g., RAMs or ROMs. The track pattern is built from the frames, and the disk pattern is built from the track patterns. The track and disk definitions are read from ASCII files at start-up time. These definitions control the pattern generation circuitry during the actual pattern generation. Two independent pattern generator channels are included. The second channel is used to write patterns on a second head (for embedded servo) or for control purposes. Requirements such as DC erase, grey codes, fill-in for data areas, and unique servo data are accommodated by this flexible approach. The pattern generator includes programmable delay of the pattern from index in one nanosecond increments. Controlled delay of the bit stream is useful in many situations such as index delay for bent arm geometries, two pass writing of servo bursts, and so on.

When a desired bit pattern cannot be accommodated by the strict frame based system, a pattern ROM is functionally replaced by optional pattern RAM board 72. This requirement is quite rare because of the very large number of patterns that is built by using combinations of the eight thousand frames in ROM. Disk patterns are very repetitive, so even when pattern RAM is required, the few pieces of the pattern that are unique is computed quickly by PC/AT 12 and stored in the appropriate pattern RAM location.

Head 22 is external to HDA 20 and is moved into position by a robotics motor that writes a precision clock track at an outer radius of disk media 26. This clock track is used to subsequently position servo data and index pulses, after which it is no longer needed. The signal is a constant frequency except at the index mark. This index mark is arbitrarily placed and consists of four missing pulses. When writing the clock track the desire is to have no write splice at the beginning/end of the pattern. The clock track can be rewritten and tested for closure over and over again. This method is called the Monte Carlo method. On average, it takes about 10 seconds to write the clock track.

There are at least two acceptable ways to write a clock, depending on the drive's servo pattern requirements. One way writes the clock track, then tests for the required accuracy (called "closure"). If the required accuracy is not there, the clock track is erased and re-written (a programmable number of times). Another approach writes the clock in a staged technique. Closure is achieved in (typically) five seconds with this method.

The clock portion of the clock/pattern board 60 generates a clock and a write gate, it checks for closure, and it uses signals for index pulse generation and a master servo pattern clock. An input from a Hall position detector in HDA 20 is used by the clock generator to phase-lock while generating the clock track. In alternative embodiments, the servopattern requires a higher frequency servo clock (for servo data positioning resolution) than can be written onto the disk. The on-disk clock frequency is multiplied up by a phase-locked-loop circuit to the required servo clock rate.

The clock writing circuitry also contains a missing clock pulse detector to avoid phase-lock loop (PLL) problems that can result from media defects in the clock track areas.

A reference clock pattern is sent to the clock R/W preamplifier board 66. Preferably, board 66 contains a head driver circuit for either thin-film or center-tapped heads, and uses, for example, a Silicon Systems, Inc. (SSI) 514 preamplifier chip. A "hold" logic line is connected to R/W preamplifier board 66 for clock sample and hold circuitry.

Automatic gain control (AGC) is used in both the clock and servo read channels to "normalize" gain to compensate for variations in heads, media, flex amps, etc.. The AGC operates by writing a reference (known gain) frequency to the disk, reading (sampling) its amplitude, and then settling the gain on the respective preamplifier 66 or 70 to an appropriate level. The AGC response is preferably slow enough so as to not vary the amplitude of individual pulses, but rather responds to sector average amplitude (SAA) changes.

The clock track is used (only) during the development of a servopattern. When a clock track has been written, a temporary index "gap" of 2 or 4 clock cycles is used. An accuracy test, called "closure", is judged by measuring the length of this gap. Tolerances in this measurement are set up initially by parameters deposited in a corresponding setup file, which is typically labelled SETUP. As such, the file can be modified with any ASCII text editor. If a particular measurement is out of tolerance, the offending clock track is erased and then rewritten.

The clock board is located in the PC/AT 12. The clock R/W preamplifier board 66 is positioned adjacent to clock head 22. Head 22 requires only one radial location on the disk 26.

The R/W board 66 is able to use a programmable write current from robotics board 42, or to use a fixed write current determined by a selectable resistor on R/W board 66.

Pattern Writing Subsystem

A pattern writing subsystem is similar to the clock writing subsystem. The pattern portion of clock/pattern board 60 uses programmable servopatterns which are generated with the aid of phase lock loop circuits. These circuits typically only require an adjustment when a new clock frequency has been programmed in.

Pattern Verification boards—On—track pattern verification consists of comparing the bit stream coming from the servo track to the bit stream generated by the pattern generator. Programmable amplitude windows are used to detect missing bits and extra bits, and programmable timing windows detect timing errors. The accept reject criteria is programmable and very flexible.

In addition to on-track verification, the verification process includes a position error signal (PES) check. As the head is slowly moved across the surface, the output of the demodulator is fed to the pattern verification board where it is filtered to detect noise and drop-outs. The head scan rate insures that every track is completely demodulated and the entire surface has been checked.

In the case of embedded (sector) servo, a separate pattern verification board is required for each surface being verified. The stand-alone nature of the various boards means that there is no need for real-time software. This greatly simplifies the software, increasing its flexibility and its ability to meet differing needs.

The operations that are at the core of the servowriting cycle are write, verify, and step. To avoid the difficulties of real-time software, the time that is required for the software to accomplish the basic operations must be less than one revolution of the disk (16 ms). A total of 7.1 milliseconds of the 16 milliseconds is consumed by software tasks, the remainder of the revolution is consumed waiting for index.

A set of basic servo frames for the servopattern are stored in read only memory (ROM), or downloaded into frame RAM board 72. A servo clock used to clockout digital servopattern data is derived from the clock track, above.

Pattern Generation—The servo pattern is generated from frames. One frame is ten clock pulses long. There are 65,520 clocks per revolution which means there are 6,552 frames per track and 234 frames per sector. Each frame is stored in a RAM which is then output to a shift register. A second RAM section is used to store pointers to a frame RAM. A pattern is generated by pointing to different frames which then are loaded into a shift register. Since the frame is ten clocks long, the shift register must be ten bits wide. The shift registers are clocked by the clock signal from the hard disk. The output of the shift registers is the data written to disk media 26.

Verification—The clock signal is used to produce a marginalized window and differentiates the servo signal to determine if a peak occurs between the two sides of the window. A threshold comparator determines if the signal is above a certain predetermined threshold between the two sides of the window.

Position Error Signal (PES)—The PES is measured during the certification operation. The error signal is ideally zero. However, due to defects and amplitude modulation the error might not be zero. The error signal is compared to a threshold to determine if the servo signal is acceptable.

The contents of each servo track is specified by a PC/AT 12 disk file which indicates which servo frame types to use when, and for what track. The overall layout of servo tracks is preferably specified by another file.

A series of servotracks are sent digitally to the servo R/W board 70, which uses the proper signal processing and driver for the servopattern head 24.

The (external) servopattern R/W head 24 is essentially the same as discussed in the clock subsystem, but it is preferably experimentally optimized for this function. In alternative applications, an additional read signal output is routed from the R/W board to a modified HDA 20 circuit board.

Spindle Control

Applications requiring external spindle control are supported by a modified HDA 20 spindle control circuit board 56 plugged into PC/AT 12. Connections are made to robotics board 42 to allow system 10 to control the spindle and to check on its status.

SERVOWRITING & CERTIFICATION

FIG. 3 shows the basic structure 100 of tracks on the disk media and sectors within the tracks. An "A" servo burst 102 and a "B" servo burst precede a data sector 106 and a data sector 107. A servo pattern 108 therefore comprises a pair of servo bursts 102 and 104. Six sectors 110 in six adjacent tracks are shown in FIG. 3. A path 112 is off-center of the ideal track in direction "ID" (for inside diameter of disk media). A path 114 is dead-center of the ideal track. A path 116 is off center of the ideal track in direction "OD" (for outside diameter of disk media). A read/write head following path 112 will read a strong "A" burst 102 followed by a weaker "B" burst 104. A read/write head following path 114 will read an "A" burst 102 followed by an equally strong "B" burst 104. A read/write head following path 116 will read a weak "A" burst 102 followed by a stronger "B" burst 104. By comparing the read back strengths of bursts 102 and 104, a read/write head can be driven in a direction that equalizes the two, and thus achieves a highly accurate position on path 114 with which to read/write data to data sector 106.

In order to run various "parametric" tests, described below, a 3F pattern must be written into a data sector 106 on a beginning, or first revolution of their media. (A "3F" pattern is a signal at three times the fundamental frequency, "2F" would therefore be at two times the fundamental, and so on.)

In FIG. 4, an exemplary 3F pattern is represented by waveform 120. Timing windows within which the peaks of waveform 120 can be read comprise signal 122. A window 124 has a waveform 120 peak that occurs within adjustable limits. A window 126 is depicted as missing a peak from waveform 120 because the peak, or bit, was late. A window 128 coincides with a peak of waveform 120, but the peak does not exceed a lower threshold, and is deemed a "missing pulse." A window 130 has a waveform 120 peak that arrives early and is right on the edge of the window. The quality of the disk media can be judged by the number and degree that bits, or peaks, arrive early or late, or are too weak or too strong. The upper and lower thresholds can be adjusted, as well as the position and width of windows to derive comparison data palatable to a computer. Trade-offs and other variations can be made by manipulating the upper and lower thresholds, as well as the position and width of windows.

FIG. 5 shows an exemplary servowriting and certification system 150 comprising a read head 152, a read/write (R/W) channel buffer 154, a data pattern generator 156, a servowriter clock and pattern generator 158, a clock R/W channel buffer 160, and a write head 162. Read and write heads 152 and 162 could be a single head, such as head 22. An SAA sampler 164 applies four analog signals to a four-channel ADC 166 that were sampled from buffer 154 during various times. The digital quantities from ADC 166 are applied to a FIFO 168 and compared to programmable thresholds in a block 170. A second read signal is picked off of buffer 154 and coupled with missing pulse, extra pulse, and over amplitude thresholds by a defect detector 172. Detected defects are memorialized by a defect recorder 174. A circumferential counter 176 receives clock and index signals an paces defect recorder 174 and a state machine 178.

To read data back from a disk, a positive and a negative threshold must be set in block 170 to some percentage of the sector average amplitude (SAA). (In the prior art, the track average amplitude (SAA) is sampled on a second revolution of the media to determine the current track's amplitude modulation.) By having the positive and negative thresholds track the SAA, a read/write circuit will be able to cope with a wide dynamic range of read back signals. In the present invention, the second revolution is used to read back the 3F pattern using a SAA value that was derived from reading an adjacent sector in the previous track. Amplitude variations along tracks and between adjacent tracks have been observed by the inventors to change very little and very slowly. Using the SAA derived from the previous track gives a close approximation of the current track's SAA, and saves one revolution time in the process.

The first operation in certification is the "parametric" tests, beginning at the outside diameter of media 26. (Direction "OD" in FIG. 3.) "Parametrics" is defined as the parameter setpoints, or control limits, allowable during disk media manufacturing. The "parametric" tests are as follows:

sector average amplitude (SAA) measurement ("3F," "2F," "1F" at outside diameter and inside diameter);

resolution measurement ("3F"/"1F," "2F"/"1F" at outside diameter and inside diameter);

erasure test (writes and erases of "1F" at outside diameter and inside diameter);

signal-to-noise test ("3F," "2F" at outside diameter and inside diameter.) thirty kilohertz bandwidth to be used to measure the noise one megahertz below carrier frequency with four filters contained on removable printed circuit boards;

low frequency modulation test ("3F, " "1F" at outside diameter and inside diameter.) Measurement shall defect modulation less than one KHz; and "D50" amplitude drop test (at the inside diameter only). This test will measure the frequency at which the amplitude drop is 50% of the amplitude of a single pulse.

The next operation is to "servowrite," which is defined as the writing of servo tracks. Head 22 (FIG. 1) will more often than not comprise two servoheads, one on each side of media 26, and each will be driven so as to simultaneously servowrite their respective tracks. After a track has been servowritten, system 150 (FIG. 5) tests and verifies by checking for missing pulses and for proper timing that a servo signal has been laid down. If an error is found, system 150 will rewrite the servo signal. The rewriting is repeated for a (predetermined) programmable number of times.

After all tracks have been servowritten, system 150 will step-in two track positions and test for "parametrics." The parametric tests, as listed above, include tests of signal amplitude, resolution, track erasure, signal signal-to-noise ratio, low frequency modulation, and "D50." The results of such tests are compared to a disk standard that is run periodically.

Certifier

After parametric tests, system 150 certifies media 24. System 150 moves to an inside diameter track and writes a so-called "3F" pattern between adjacent servo bursts. The timing required to interleave the data between the servo bursts without overwriting the servo bursts is complex and difficult to implement with discrete logic. Therefore, state machine 178 (FIG. 5) is preferably used to implement this function.

Four tests are done simultaneously "on-track," immediately following the writing of a track with the "3F" pattern. (See block 170 in FIG. 5.) These tests perform a "verification" function.

1. Over Amplitude Test—counts all the pulses that exceed a predefined positive or negative threshold. The threshold is programmable via the SETUP file in 256 steps from zero to Thmax1. (Thmax1 can be set in hardware to any value up to 400% SAA.)

2. Under Amplitude (Missing Pulse) Test—counts all the missing pulses from the qualification windows. There are two parameters involved in this test, as follows:
a) a qualification window duration is programmable in two nanosecond increments. The centering of the ideal pulse in the timing window has a resolution of 1ns for dedicated surface servo patterns. The timing window for sync and data pulses is independently programmable from the position pulse timing window; and
b) a detection threshold is programmable in 256 steps from zero to Thmax2. (Thmax2 can be set in hardware to any value up to 400% SAA).

3. Extra Pulse Test—detects all the transitions that occur outside of the qualification windows and have an amplitude greater than the extra pulse threshold. There are two parameters involved in this test, as follows:
a) a qualification window duration is programmable in two nanosecond increments. The centering of the ideal pulse in the timing window has a resolution of 1ns for dedicated surface servo patterns. The timing window for sync and data pulses is independently programmable from the position pulse timing window; and
b) a extra pulse threshold is programmable in 256 steps from zero to Thmax3. (Thmax3 can be set in hardware to any value up to 400% of SAA.)

4. Timing Error Test—the under amplitude and extra pulse tests are qualified by timing windows, and so a timing error test is incidental. Any misplaced pulse will generate a missing pulse and an extra pulse in a particular frame.

APES test is done while moving the heads slowly to the home position at a speed which insures overlapping of each pair of servo and guard band tracks.

PES Test—detects all the spikes on the PES signals that are greater than the PES threshold. The PES threshold is programmable in 256 steps from zero to Thmax4. Thmax4 can be set by hardware up to ten volts. The PES signals are run through band pass filters that are hardware set. There are two band pass filters for each PES channel with the thresholds independently programmable. This allows two sets of accept or reject parameters for each channel (simulating track following and seeking).

The respective thresholds for each of the above tests are preferably programmable, and each is compared to the levels found from the previous track. The "3F" pattern is then erased. On the revolution after erasure, system 150 does an extra pulse test to see if any bits cannot be erased.

All of the above tests are run concurrently on each head 22, at practically the same time. If a defect is found, system 150 confirms the defect repeats itself a programmable number of times. If a defect is found, the position and length is stored to a memory file on PC/AT 12. At alternative point during the track tests, a position error signal from the servo pattern is measured and is compared to an acceptable level.

After disk media certification, system 150 formats cylinder zero (the "maintenance" cylinder), and writes the addresses of any sectors that were determined to contain defects to a "bad block map."

A certification reduces the probability a user will see a defect in the data areas of the media. Sectors with defects are written to a "bad block map" on cylinder zero in disk media 26. The read channel has a 30 MHz bandwidth with linearity of about one percent between 0.2 millivolts and two millivolts peak-to-peak (p-p) differential, as measured at the input of a SSI 514-type opamp (used as a preamplifier). The read back pattern is verified against the programmed pattern (the pattern that was intended to be written).

Acceptance/Rejection Criteria

The acceptance/rejection criteria are defined by setting parameters in the SETUP file. Each extra or missing pulse test includes a timing test. The acceptance/rejection criteria are as follows:

- number of missing sync or data pulses per track;
- minimum spacing between bad frames caused by a missing sync or data transition (programmable in number of frames);
- portions of the track can be specified to be error free or to be free of any specific error or combination of errors. (This requires simple changes to the TRACK.TYP file an ASCII file);
- number of missing position pulses per track
- minimum spacing between bad frames caused by a missing position transition (programmable in number of frames);
- number of extra pulses per track; and
- minimum spacing between bad frames caused by extra pulse (programmable in number of frames).

An autocalibration of the centering of the verification window is done for each drive to be servowritten after writing the cinch. This autocalibration of the window compensates for head and media variations. The correction of the window centering is done as the head moves from the outside diameter to the inside diameter.

Parametric tests—A set of parametric tests are done with reference to a "standard" disk that is routinely measured. The parametric tests are done on a sampling basis. Data is preferably printed to a file so that any general trends can be identified. Preferably, all filters for parametric tests are of modular construction, and mounted on separate PC/AT 12 boards, such that they can be easily changed. The parametric tests comprise:

- sector average amplitude (SAA)—measures the sector average amplitude. The SAA test measures the average amplitude of one sector at a time and takes the average of the 28 sectors. In this way high frequency modulation and disk position does not affect the sector average amplitude (SAA).
- saturation curve—
    - resolution—is the ratio of "3F" to "1F" and "2F" to "1F" sector average amplitude (SAA).
    - erasure—measures the level of erasure for a "1F" signal. The "1F" signal is written, measured and then erased with the erase gap. The resulting signal is then measured and the ratio in decibels is calculated. The signal is measured through a 30 KHz bandwidth filter. signal-to-noise—the carrier is written "3F" or "2F" and the amplitude is measured. Then the noise is measured without erasing the signal. The noise is measured one megahertz below the carrier frequency. The signals are measured through a 30 KHz lowpass filter.
- low frequency modulation—measures the ratio of low frequency modulation to the SAA. This measurement is done by taking the sector amplitude values and finding the maximum and minimum value. The modulation is determined by the following equation:

$$M_{outside} \text{ diameter} = \frac{2*[max - min]}{SAA}$$

- D50—the "D50" frequency results in peak amplitudes of 50% of the low frequency amplitude.

Track quality tests concentrate on the data areas of every track. Most of the tests compare sample amplitudes to a reference signal. Preferably, the reference used is the SAA. Threshold levels are used to adjust the reference signal. These threshold levels are programmable and have a wide range. The SAA signal can be changed each sector or each revolution. If the SAA signal is changed each sector, then the SAA signal will retain much of the low frequency modulation. If the SAA signal is changed only once a revolution then the signal remains constant and any modulation will add or subtract from the threshold level. The reference signal for the current track is the SAA from the previous track because otherwise the machine would take an extra revolution to determine the SAA. The track quality tests comprise:

- missing pulse—Compares the "3F" signal level to the reference. A phase locked loop (PLL) syncs up to the "3F" signal and the PLL signal is used to construct a window. The amplitude is compared to the reference at alternative threshold in this window. If a missing pulse is found the position and length is recorded.
- over-amplitude pulse—Similar to the Missing Pulse test, except that the test looks for a pulse that is greater than 150% of the SAA signal. The position and length are recorded.
- modulation—Similar to the Missing Pulse test, except that the test is done on the envelope signal and not the "3F" signal.

The position and length is recorded. bit shift—The bit shift measurement is made on the "3F" signal. A PLL syncs up to the "3F" signal, and the PLL signal is phase compared with the "3F" signal by a comparator. The output of the phase comparator is proportional to the phase difference. This signal is used as input into a D-K flip-flop and it is also input to a programmable delay line. The output of the delay line is the clock to the D-K flip-flop. If the phase comparator output is long, the signal will pass through the delay line while the signal is still present at the input of the D-K flip-flop. This will cause a signal to pass through the flip-flop which can be found by a computer. The position of the defect is recorded.

- extra pulse—is done after the data areas have been erased and compares the read signal to the SAA at the appropriate threshold. The position of the defect is recorded.

Write Current Test—is done while in manual mode. The "3F" amplitude of a signal is measured at different write currents. The range is five milliamps to fifty milliamps in one milliamps increments. The output is displayed on the screen and written to a file.

Burst On Error—a quality control test that will mark errors with a "1F" burst beginning at the location of the error. The test is selectable from a computer keyboard. All areas except the servo areas are erased.

Defect Map Writing—after the tests, a "bad block map" is written, e.g., by defect recorder 174, at cylinder 0.

Output Signals—the following fifty ohm (50 Ω) impedance and use BNC-type connectors signals are available from system 150:

Index *

Read Signal Head ZERO*
Read Signal Head ONE
Write Signal Head ZERO
Write Signal Head ONE
Missing Pulse Error Head ZERO
Missing pulse Error Head ONE
Extra Pulse Error Head ZERO
Extra Pulse Error Head ONE
Modulation Error Head ZERO
Modulation Error Head ONE
Over-amplitude pulse Error Head ZERO
Over-amplitude pulse Error Head ONE
Bit Shift Error Head ZERO
Bit Shift Error Head ONE
Servo Position Error Signal Head ZERO
Servo Position Error Signal Head ONE
Read Signal Input Head ZERO
Read Signal Input Head ONE These outputs have a minimum carrier-to-system noise level of minus sixty decibels. The carrier is defined as being a 0.5 mV p-p sinewave signal.

Calibration

An input signal for each head 22 is made available for calibration. An arbitrary function generator can be used to simulate the read signal with missing pulses, extra pulses or any other types of defects. Using an AFG and the output error signals listed above, the actual threshold levels for each test and each channel can be measured. These input signals are put in after the 514-type preamplifier.

Reference Disk

A reference disk for parametric comparisons has a specially located hole through the media, or alternatively, has a reflective tape on the media, either of which can be sensed by system 150 with appropriate pickups. System 150 tests parametrics on the reference disk automatically when it is loaded. The calibration settings for the reference disk are read from a file, either on the PC/AT 12 hard disk drive or floppy drive.

Using Less Time to Test Disks

A method of certifying a magnetic disk in fewer than an average of five revolutions of the magnetic disk per track, according to the present invention, comprises:
 writing a 3F data test pattern to a current track of the magnetic disk on a first revolution;
 reading back the data test pattern and sampling the SAA of the current track on a second revolution, the reading back based on the sampling of SAA of a previous track adjacent to the current track;
 erasing the data test pattern in the current track on a third revolution; and
 detecting any "extra bit" remaining in the current track in the area erased by the erasing means, the detecting of the extra bits is done on a fourth revolution and is based on the sampling of the SAA for the current track done on the second revolution.

SECOND EMBODIMENT OF THE PRESENT INVENTION

A second embodiment of the present invention is similar to that described above and shown in FIGS. 1–5, and does servowriting and certifying for high-density floppy disks. A floppy disk to be tested moves from an autoloader "in bin" to be loaded on the drive spindle, which will spin up to speed while a pair of R/W heads are moved into position. The system will then check the index signal from the floppy disk to make sure it is spinning properly. The heads are dynamically loaded onto the floppy media and moved to a beginning track. The first operation done is the parametric tests at the outside diameter. The operation that follows is a servo-write.

Both R/W heads servowrite respective tracks at the same time. After a track has been servowritten, the system will certify the servo signal by checking for missing pulses and by looking at the bit timing. If an error is found, the system rewrites the servo signal. This process may be repeated for a programmable number of times. ("Programmable" means a access to the value can be made via PC/AT 12.) After all tracks have been servowritten, the unit will step in two more tracks, and test for "parametrics," which include amplitude, resolution, erasure, signal-to-noise, low frequency modulation, and "D50." The results of these tests will be compared to a standard disk that is run periodically for calibration.

After the above tests, the system begins certifying the media. The system moves to the inside diameter track and writes a 3F pattern between the already recorded servo bursts. ("3F" is three times the fundamental frequency.) On a next revolution, a 3F pattern from the disk is tested for missing pulse, over-amplitude pulse, high frequency modulation and bit shift, as described above. Thresholds for these tests are also programmable, and each is compared to a corresponding sector average amplitude from the previous track. The 3F pattern is erased, and on the next revolution, the system does an extra pulse test. All tests are done on both heads at the same time.

If a defect is found, the system will check if the defect repeats itself a programmable number of times. If a defect is confirmed, its position and length are stored in a file on the PC/AT 12 and alternatively on the disk-under-test itself. At some point during track testing, a position error signal from the servo pattern is measured and compared to an acceptance level. After the certification operation, the system formats cylinder zero (the maintenance cylinder), and records a list of the addresses of the sectors that contain defects to a so-called "bad block map." The heads are then dynamically unloaded, and the spindle stops as the heads are moving back to home position. The floppy disk is unloaded and the next floppy disk will push the floppy disk just tested onto a ramp that will drop it in the "accept" or "reject" bin. Reject criteria is preferably programmable, and its setting must depend on the number of errors and/or quality of the servo signal to be tolerated by the user.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system for certifying a magnetic disk having servotracks in fewer than an average of five revolutions of the magnetic disk per track, the system comprising:
 means to write a data test pattern to a current track of the magnetic disk on a first revolution;

means to read back said data test pattern and to sample the sector average amplitude (SAA) of current track on a second revolution, said data read back based on the sampling of SAA of a previous track adjacent to the current track;

means to erase said data test pattern in the current track on a third revolution; and means to detect an "extra bit" remaining in the current track in the area erased by the erasing means, the detecting of any extra bits is done on a fourth revolution and is based on the sampling of SAA for the current track done on said second revolution.

2. A method of certifying a magnetic disk having servotracks in fewer than an average of five revolutions of the magnetic disk per track, the method comprising the steps of:

writing a data test pattern to data sectors in a current track of the magnetic disk on a first revolution;

reading back said data test pattern sector-by-sector and sampling the sector average amplitude (SAA) of each sector on said current track on a second revolution, said reading back based on the sampling of respective SAA values for a previously read track that is adjacent to said current track;

erasing said data test pattern in the current track on a third revolution; and detecting any "extra bit" remaining in the current track in the area erased by the erasing means, the detecting of said extra bits is done on a fourth revolution and is based on the sampling of the SAA for the current track done on said second revolution.

3. The method of claim 2, wherein:

the writing step is such that said first revolution immediately precedes said second revolution;

the reading back step is such that said second revolution immediately precedes said third revolution; and the erasing step is such that said third revolution immediately precedes said fourth revolution.

4. The method of claim 2, wherein:

the writing, reading back and erasing steps are such that said data test pattern is a "3F" pattern.

5. A combination servowriter and certifier apparatus for initializing and testing rotating magnetic recording mediums, comprising:

a head disk assembly (HDA) for supporting and rotating a magnetic recording medium to be initialized and tested;

read/write (R/W) head means proximate to said HDA and said magnetic recording medium for reading and writing data on a succession of data tracks;

a sector average amplitude (SAA) detection and recording means coupled to the R/W head means for reading signal amplitudes and storing representations of those amplitudes for a set of corresponding tracks on said magnetic recording medium; and threshold setting means coupled to the SAA detection and recording means for setting a positive and a negative threshold on a first revolution of said magnetic recording medium with the R/W head positioned over a current one of said data tracks such that each threshold maintains a percentage value of said representations of SAA for an adjacent one of sad data tracks which was previously sampled and stored, wherein the R/W head means is enabled to cope with a dynamic range of readback signals on said first revolution, and wherein the SAA derived from a previous track provides for an approximation of a current track's SAA, and saves one revolution time in the process.

6. The apparatus of claim 5, further comprising:

parametric testing means coupled to the R/W head means for conducting the following tests: sector average amplitude measurement, resolution measurement, erasure test, signal-to-noise test, low frequency modulation test, and a test to measure the frequency at which the amplitude drop is 50% of the amplitude of a single pulse.

7. The apparatus of claim 5, further comprising:

servowriting means coupled to the HDA and the R/W head means for writing a plurality of servo track on said magnetic recording medium; and testing and verification means coupled to the HDA and the R/W head means for checking for missing pulses and for proper timing of a servo signal from a servo track that has been previously been laid down by the servowriting means.

8. The apparatus of claim 7, further comprising:

rewriting means coupled to the servowriting means and testing and verification means for checking for errors and for rewriting said servo track if an error has been found.

9. The apparatus of claim 5, further comprising:

media certifying means coupled to the HDA and the R/W head means for writing a "3F" pattern between adjacent servo bursts and including a state machine for timing an interleave of data between said servo bursts without overwriting said servo bursts.

10. The apparatus of claim 9, further comprising:

four-part testing means coupled to the R/W head means for conducting simultaneous on-track tests including an over-amplitude test, an under-amplitude test, an extra pulse test and a timing error test.

11. The apparatus of claim 10, further comprising:

adjustable threshold means connected to the four-part testing means for providing adjustable thresholds for each of said tests wherein each is compared with levels detected from a previously accessed track.

* * * * *